(12) United States Patent
Arnone et al.

(10) Patent No.: US 7,815,082 B1
(45) Date of Patent: Oct. 19, 2010

(54) BICYCLE U-LOCK BOOKBAG CARRIER COMBINATION

(76) Inventors: Mark Arnone, 9 McKinley La., Chico, CA (US) 95973; Anthony Salvadör Palermo, 22503 Adobe Rd., Red Bluff, CA (US) 96080

( * ) Notice: Subject to any disclaimer, the term of this patent is extended or adjusted under 35 U.S.C. 154(b) by 789 days.

(21) Appl. No.: 11/717,506

(22) Filed: Mar. 12, 2007

(51) Int. Cl.
*B62J 7/04* (2006.01)
*B62J 11/00* (2006.01)

(52) U.S. Cl. .................. 224/427; 224/431; 224/448; 224/455; 224/935

(58) Field of Classification Search .................. 224/427, 224/431, 441, 448, 452, 453, 455, 935
See application file for complete search history.

(56) References Cited

U.S. PATENT DOCUMENTS

| | | | | |
|---|---|---|---|---|
| 4,256,322 A | * | 3/1981 | Otsuka et al. ............... | 224/418 |
| 5,133,568 A | * | 7/1992 | Balterman ............... | 280/288.4 |
| 5,135,143 A | * | 8/1992 | Naughton .................... | 224/416 |
| 5,226,341 A | * | 7/1993 | Shores ....................... | 74/551.8 |
| 5,251,796 A | * | 10/1993 | Shelhart ..................... | 224/454 |
| 5,395,016 A | * | 3/1995 | Minoura ..................... | 224/425 |
| 5,464,135 A | * | 11/1995 | Studdiford .................. | 224/420 |
| 5,467,620 A | * | 11/1995 | Byrd, Jr. ..................... | 70/38 A |
| 5,551,609 A | * | 9/1996 | Best ........................... | 224/440 |
| 5,634,578 A | * | 6/1997 | Best ........................... | 224/456 |
| 5,832,762 A | * | 11/1998 | McDaid ....................... | 70/455 |
| 5,836,491 A | * | 11/1998 | Chuang ....................... | 224/456 |
| 6,398,247 B1 | * | 6/2002 | Kuo ........................... | 280/288.4 |

FOREIGN PATENT DOCUMENTS

DE 4102918 C1 * 7/1992
JP 10152081 A * 6/1998

* cited by examiner

*Primary Examiner*—Justin M Larson
(74) *Attorney, Agent, or Firm*—Robert S. Smith (57) ABSTRACT

A U-lock holder mounted over the rear wheel of a bicycle and attached to the seat post for storing a U-lock—the U-lock to be available for securing the bicycle to a post or, on which are placed packages when it is required to transport the package on the bicycle.

8 Claims, 7 Drawing Sheets

BICYCLE U-LOCK BOOKBAG CARRIER COMBINATION

FIELD OF THE INVENTION

This invention relates to bicycle u-locks and particularly to a dual-purpose lock that also serves to carry book-bags when not used as a lock.

BACKGROUND AND INFORMATION DISCLOSURE

Figure 1A:
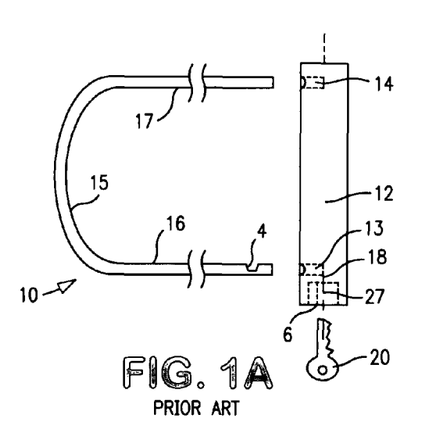
FIGS. 1A and 1B show the typical U-lock (open and closed) of the prior art.
Figure 1B:
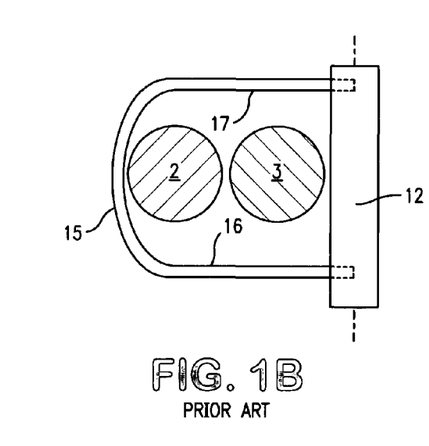

In the context of this specification, the term "U-lock" as shown in FIG. 1a (dissembled) and FIG. 1b (assembled) (prior art) is to be understood as comprising a U bar 15 with two legs 16. 17 whose ends slide into a clasp 12.

The clasp 12 in the case of this specification, is a cylindrical bar with a pair of holes 13, 14 near respective ends of the legs dimensioned and positioned to enable sliding the end of one leg 16 into one hole 13 and the end of the other leg 17 into the other hole 14. A lock 18 (in phantom) is positioned axially in one end of bar that is engageable with a groove 4 in the side of the respective leg 16 providing that the U-bar 15 is lockable to the cylindrical clasp 12.

The locks of the type shown in FIGS. 1A, 1B are available on the market in a size range wherein the length of the legs is about 10-12 inches and the separation of the legs is 5-6 inches.

The U lock in FIG. 1B is shown enclosing (in section) a part of the bicycle frame 2 and a pole 3.

The type of lock in this size range is commonly used to secure a bicycle. The large size enables that a bicycle wheel can be locked to the bike frame or the frame and wheel can be locked to a post thereby providing protection against theft of a wheel, theft of a frame, or both.

A variety of versions of the U-lock have been disclosed in patent literature. These disclosures are primarily directed toward increasing the strength of the lock to prevent breaking the lock.

For example, U.S. Pat. No. 5,467,620 discloses a U-lock including a detachable header with extensions that fit around the legs of the U-bar which provide strength to the U-lock. The header can be used so that its base is locked at the end of the arms U.S. Pat. No. 5,832,762 discloses a U-lock key-way protector comprising a cylindrical tube mounted for rotation on a U-lock cross bar. A keyway aperture allows access to the U-lock keyway when in an unprotective position U.S. Pat. No. 5,226,341 discloses a bracket assembly that releaseably clamps the U-Lock with the legs of the black body extended forward from the first set of handlebars similarly to a set of Aero™ handle bars.

The bicyclist who rides his bike (for example, to school) is faced with two problems.

The first problem is how to carry his book-bag while cycling. The second problem is how to secure his bicycle while he is in class.

None of the disclosures address this common problem.

SUMMARY OF THE INVENTION

It is an object of this invention to provide a U-lock carrier that is transported on the bicycle so that the U-lock can be used to lock the bicycle and prevent its use such as when the bicycle is unattended by its owner and can be used in conjunction with the U-block carrier to carry items such as book-bags when the cyclist is riding the bicycle.

This invention is directed toward a U-lock holder that is mounted behind the seat (over the rear wheel) of a bicycle.

The U-lock holder is designed to permit orienting the U-bar so that the plane of the two legs of the U is fixed horizontally. Book-bags or other packages are then strapped to the U-bar thereby facilitating transport of the package.

When the bike is to be parked and secured, the U-lock is removed from the U-lock holder and arranged to enclose a wheel and frame member or a wheel and frame member and any nearby convenient post.

DESCRIPTION OF PREFERRED EMBODIMENTS

Turning now to a discussion of the drawings, FIGS. 1A and 1B (prior art) shows a typical U-lock 10 as discussed in the BACKGROUND comprising a U-bar 15 and a straight bar 12.

For the purposes of this invention such as carrying a book bag 19 (FIG. 4) while riding a bike 21, a preferred length of the U-bar from the ends of legs 16, 17 of U-bar 15 to a point midway between legs 16 and 17 is approximately 12.5 inches.

U-lock 10 may be any one of several makes presently on the market, for example, a Kryptolok™ LS or a Trek Kryptonite Alibaba™ U-lock.

Figure 2A:
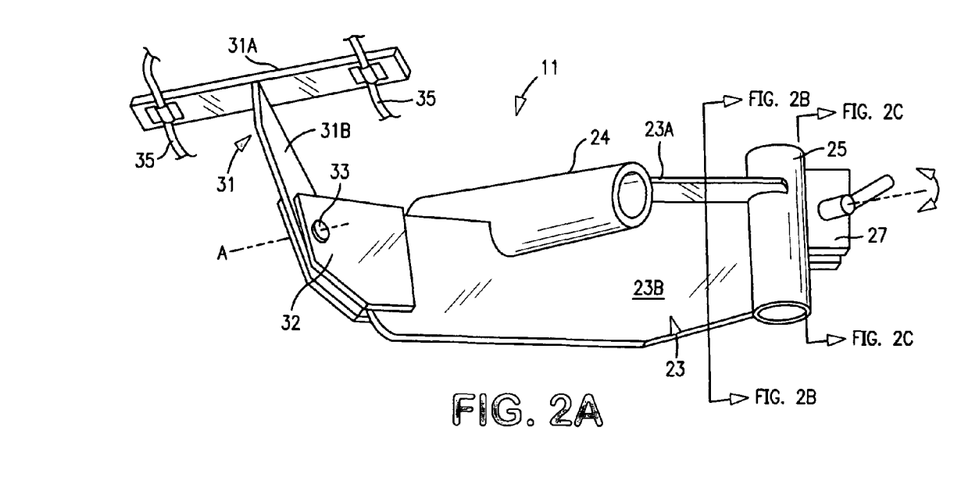
FIG. 2A is a side perspective view of the U-lock holder of this invention.
Figure 2B:
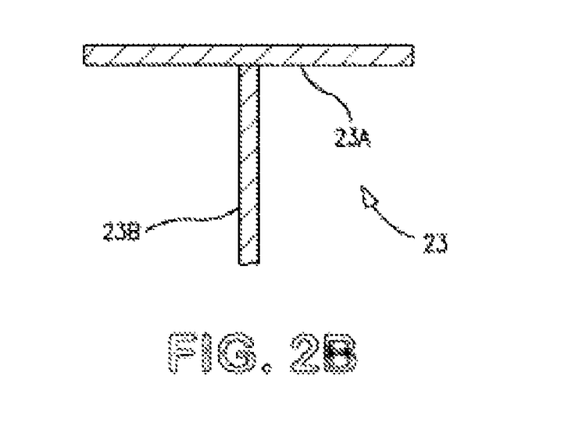
FIG. 2B is a sectional view of the spine member of the invention.
Figure 4:
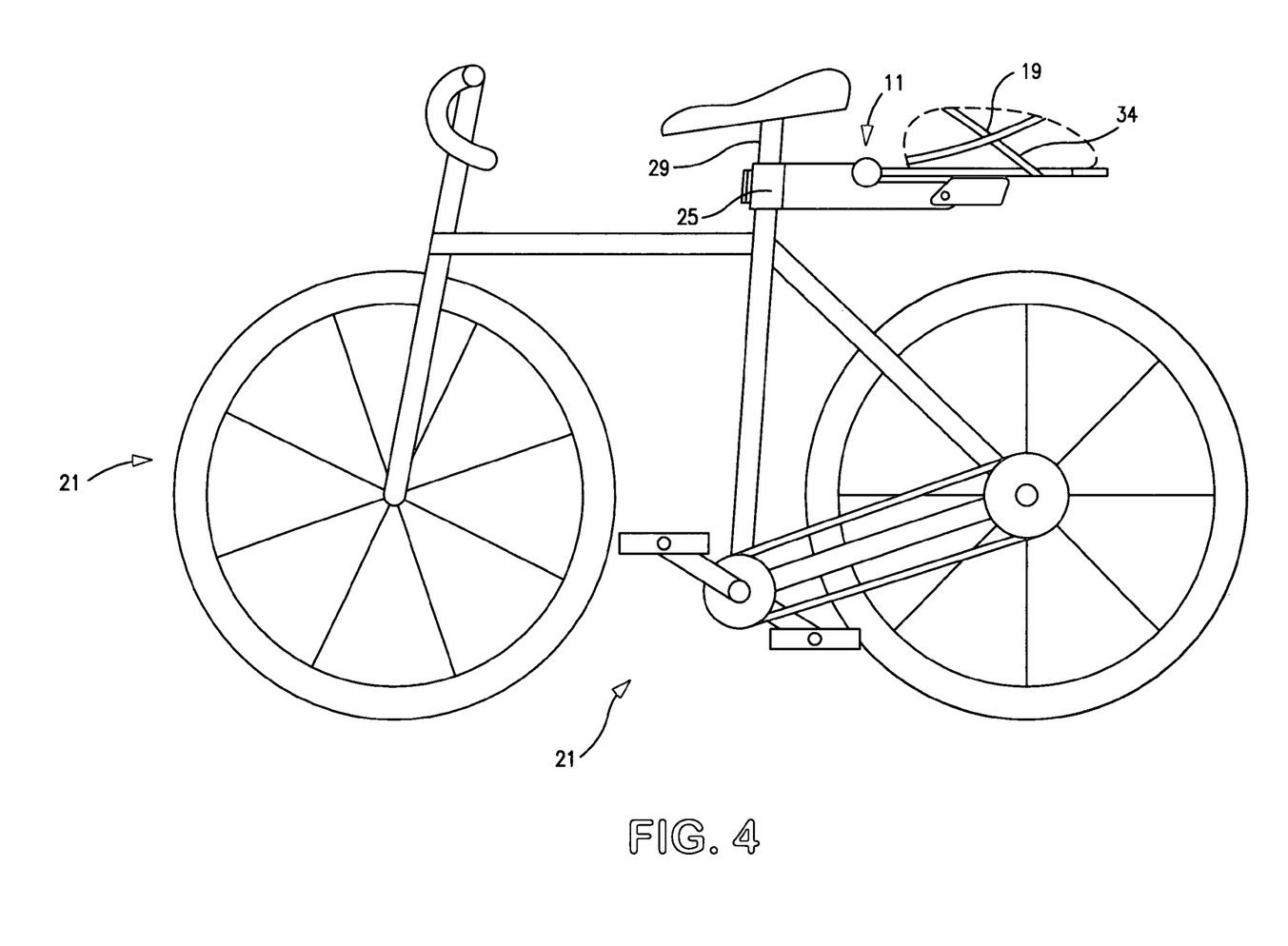
FIG. 4 shows the U-lock holder mounted on the seat post of a bicycle.

FIG. 2A shows a side perspective view of the U-lock holder 11 of this invention. Plates 23A and 23B are shown welded together to form a spine 23. An edge of plate 23B is welded perpendicularly to a surface of plate 23A. Spine 23 has a "T" shaped cross-section as shown in FIG. 2B The forward end spine 23 is welded to a collar 25 that is dimensioned to telescope onto the post 29 of the seat of a bicycle as shown in FIG. 4. The axis of collar 25 is perpendicular to plate 23A and parallel to plate 23B.

Figure 2C:
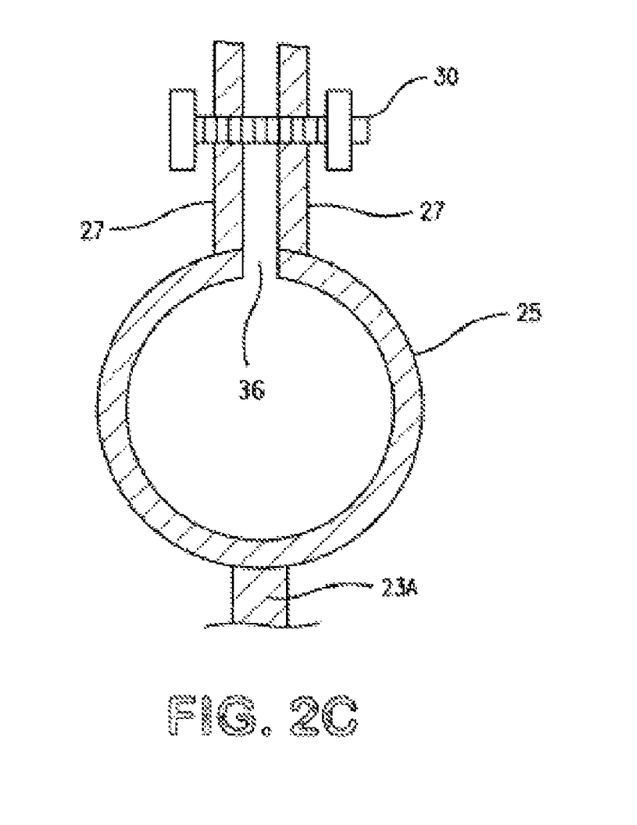
FIG. 2C is a sectional view showing of the collar for attachment to the seat pole.

As shown in FIG. 2C, a slot 36 is formed in collar 25 parallel to the centerline of collar 25. Edges of a pair of lobes 27 are welded onto the side of collar 25 on opposite sides of slot 36. A screw 30 is threaded through lobes 27.

The collar is tightened onto seat post 29 by tightening screw 30 thereby drawing lobes 27 together and securing the U-lock holder 11 onto the seat post 29.

A cylindrical sleeve 24 is mounted onto spine 23 next to collar 25. The axis of sleeve 24 is perpendicular to the axis of collar 25 and parallel to plate 23A.

An elevator member 31 is hingeably mounted on an end of bracket 23 opposite collar 25.

Elevator member 31 comprises a cross member 31A welded onto stem 31B (FIG. 2A).

The other end of stem 31B is hingebly attached by a means for attaching in the form of a hinge 32 to spine plate 23B. Hinge bolt 33 passes through hinge 32 and spine plate 23B.

Figure 3:
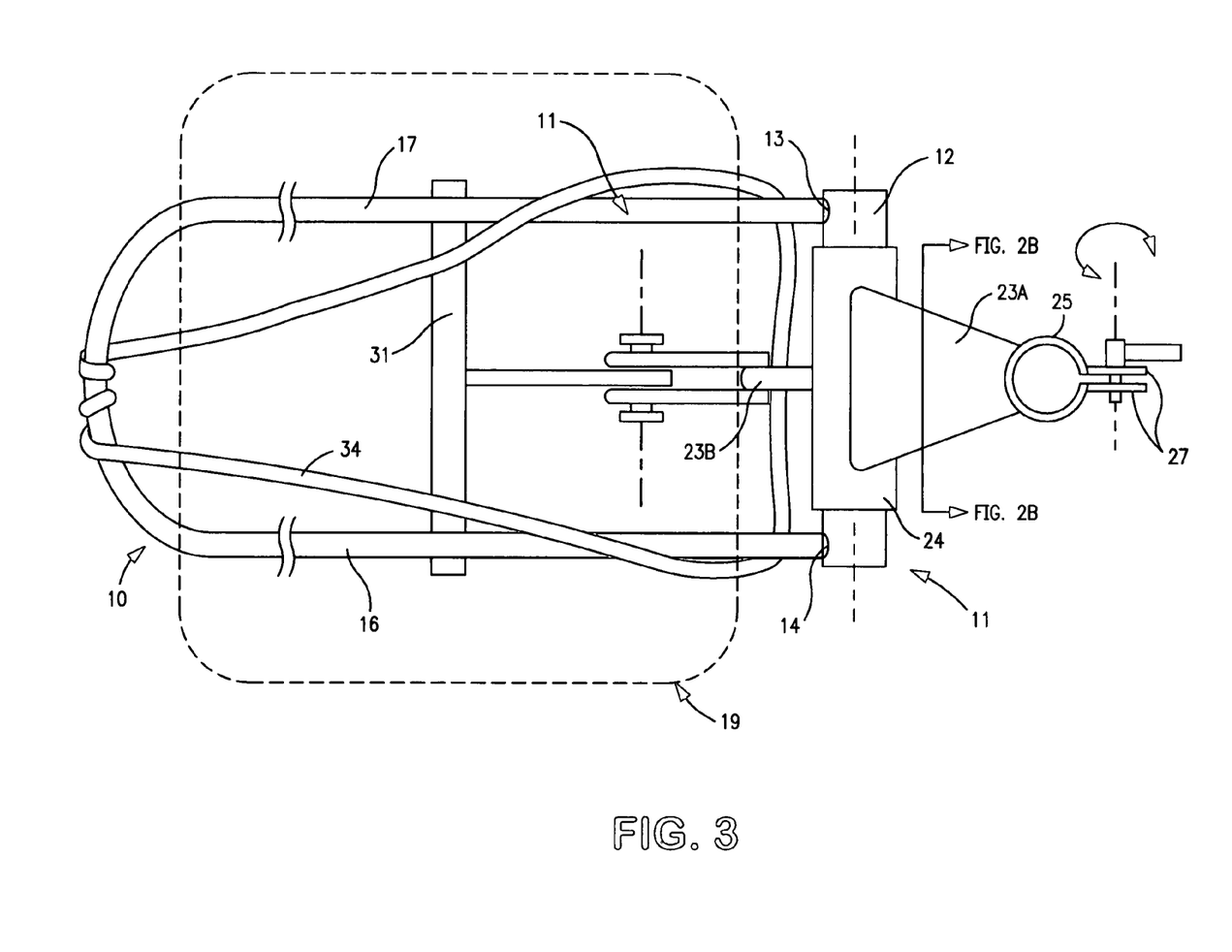
FIG. 3 is a top view showing the U-lock secured to the U-lock holder.

As shown in FIG. 3, the cross bar 12 of U-lock 10 telescopes through sleeve 24. Each leg 16, 17 of u-lock 10 is then inserted in a respective opening 13, 14 thereby securing the U-lock 10 onto the U-lock holder 11.

FIG. 4 shows U-lock holder 11 attached to a bicycle wherein seat pole 29 of bicycle 21 passes through collar 25.

When it is required to carry a pack on the bicycle, the U-lock 10, with legs attached to cross bar 12, is rotated to where the U-bar is supported on the elevator member 31.

Figure 5:
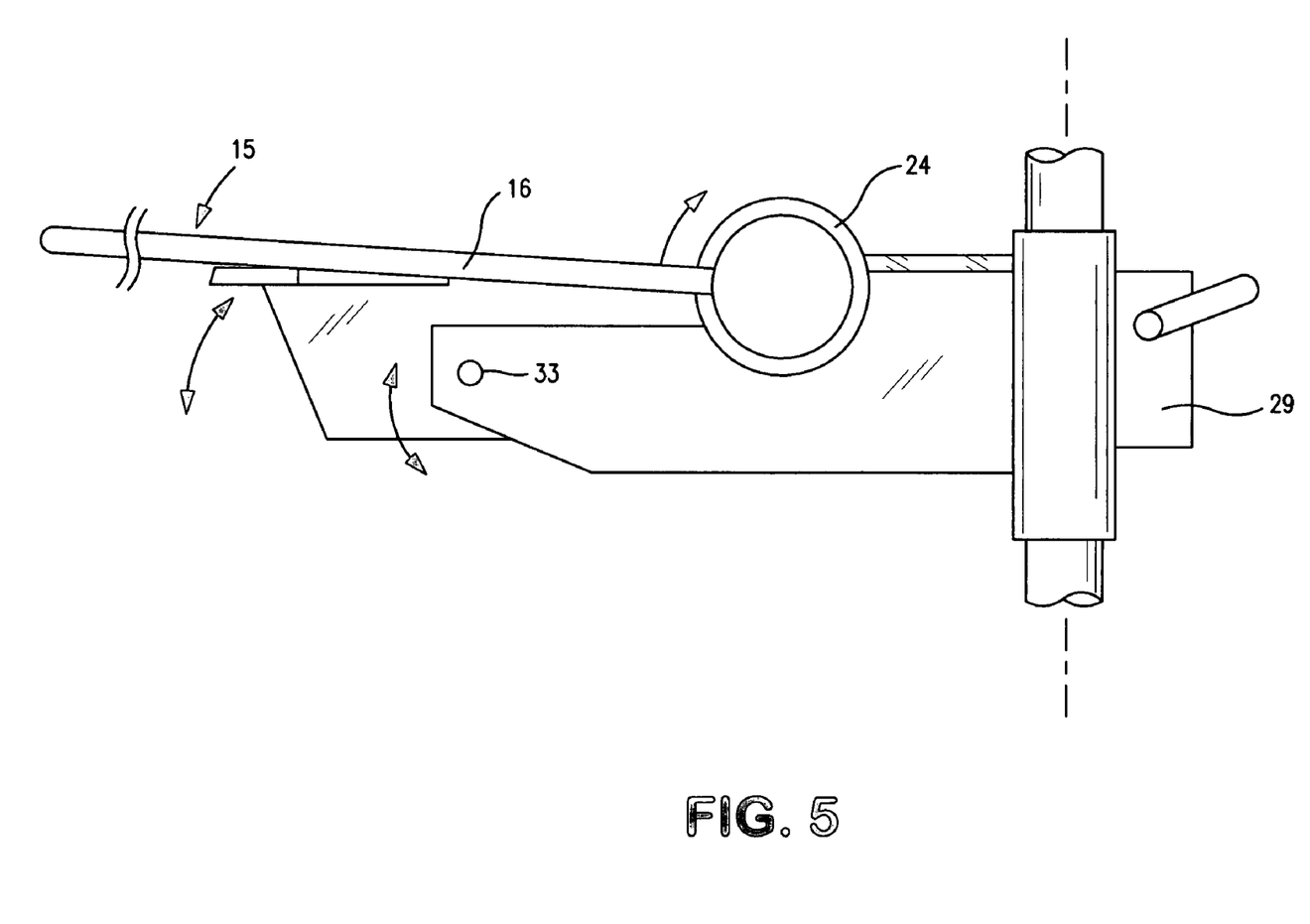
FIG. 5 shows the U-lock oriented and supported by the elevation member horizontally.

Inclination of the U-bar 15 is selected for convenience by orienting the elevator member around axis A (FIG. 2A). In most instances, the U-bar 15 is selected to be horizontal as shown in FIG. 5.

The U bar 15 and straight bar 12 are removed from the U-lock holder 11 when it is required to apply the U-lock 10 to securing the bicycle to a convenient post as is well known in the art.

There has been described a U-lock holder 11 that satisfies the objects of the invention which are:

to provide a U-lock holder mounted over the rear wheel of a bicycle on which a U-lock can be stored when not in use to lock the bicycle to a post;

to provide, in combination with the U-lock, a platform mounted on the bicycle for carrying packages. Inclination of the plane of the legs 16, 17 of the U-bar 15 for supporting the package is selectable The legs are shown as horizontal in FIG. 5.

The U-lock holder has been described as a spine bracket having, on one end, a means for attachment to a seat pole or frame member of a bicycle. Means for attachment to the U-bar is located in the middle of the U-lock holder. Means for adjustably supporting a package on a U-bar is located on the other (trailing) end of the U-lock holder.

Variations and modifications of the invention may be contemplated after reading the specification and studying the drawings which are within the scope of the invention.

The spine 23 is contemplated in several forms.:

For example, FIG. 4 shows the spine 11 as a single plate parallel (coplanar) to seat post 29.

FIG. 2A shows the spine as a pair of rectangular plates joined together to have a "T" shaped cross-section.

Figures 6A, 6B:
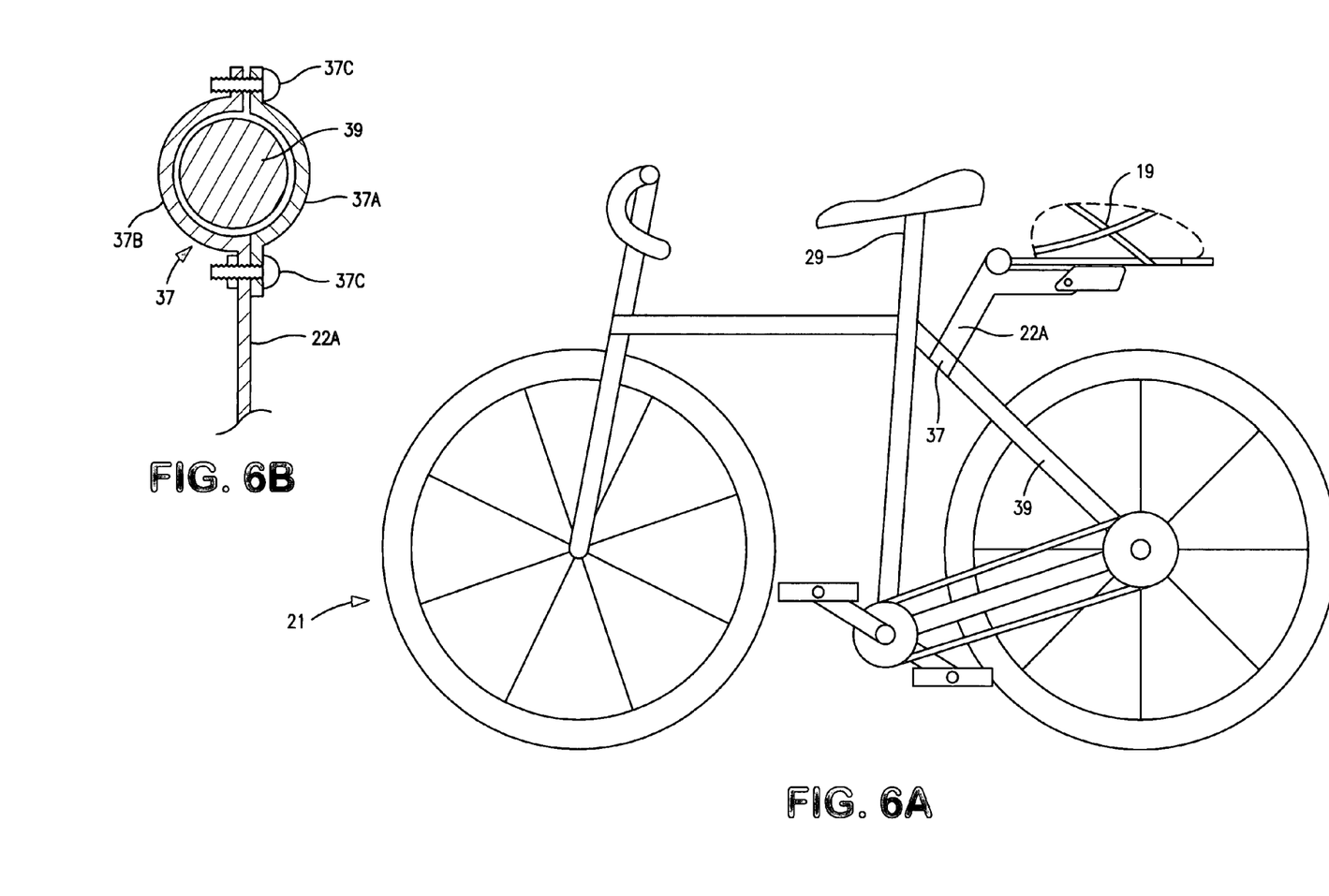
FIG. 6A shows the spine member being an L-shaped plate for attachment of the invention to a frame member of the bicycle.
FIG. 6B shows the clamp of FIG. 6A.

FIG. 6A shows the spine as being a single L-shaped plate 22A which has a clamp 37 on one end that permits attaching the end of plate 22A to the frame 39 of the bicycle 21.

FIG. 6B shows clamp 37 in cross section capturing frame 39 by leaf 37A bolted to leaf 37B by bolts 37C.

The "two-plate" construction of FIG. 2A obviously provides strong support to the collar 25, sleeve 24 and elevator member 31.

FIG. 3 is a top view showing (in phantom) a package 19 secured to the U-lock holder—U-lock combination by a band 34.

FIG. 2 shows elastic loops 35 (cut away) mounted on the ends of cross member 31A Legs 16 and 17 are passed through loops 35 and locked into cross bar 12 so that the U-lock is prevented from bouncing on cross member 31A.

In one embodiment, the split collar and lobes of FIG. 2C is replaced by a set-screw in collar 25 for securing the position of the U-lock holder on the seat pole 29.

Figure 7:
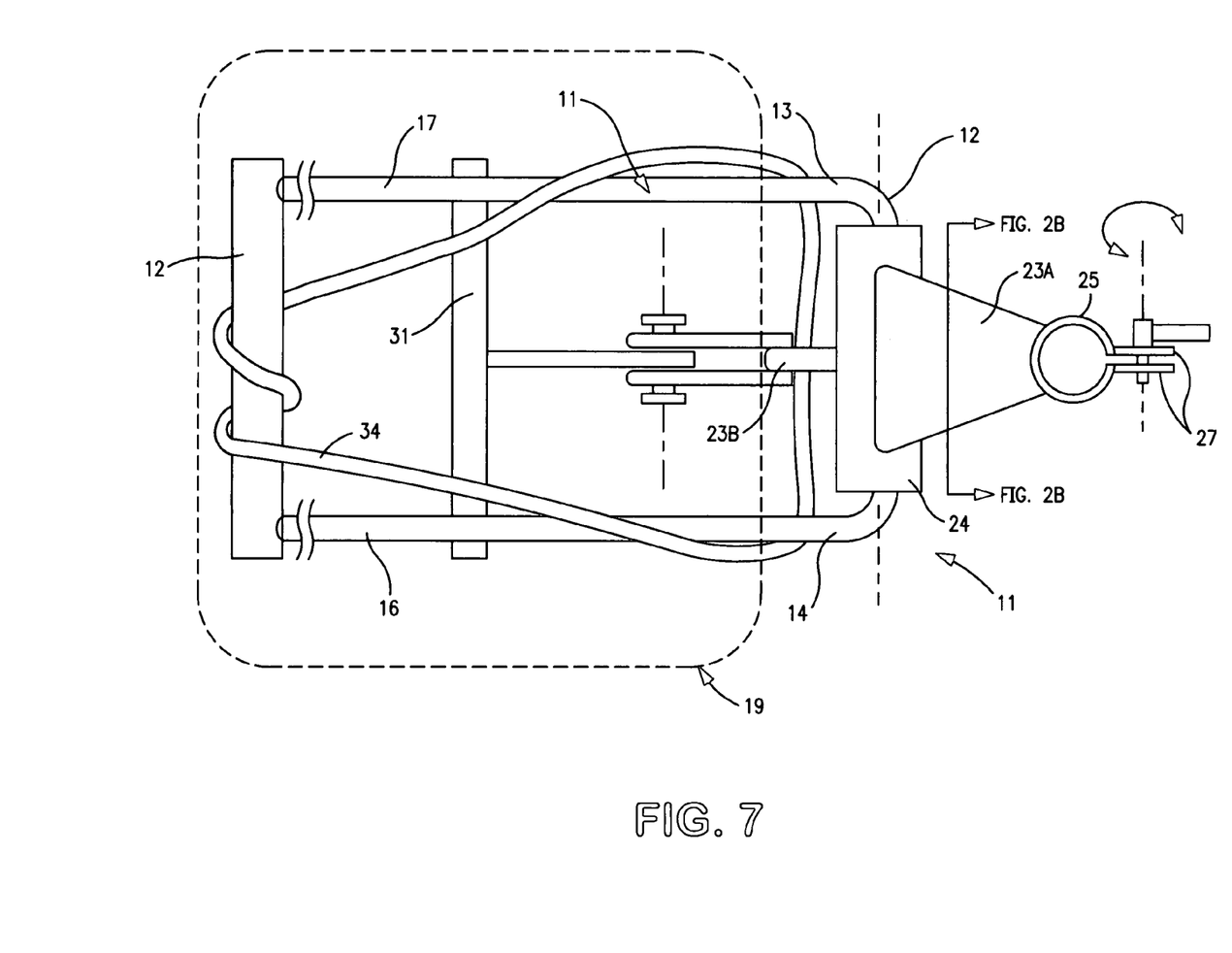
FIG. 7 shows the U section of the U-lock captured in sleeve 24.

FIG. 7 shows another embodiment in which sleeve 24 is configured to permit sliding leg 15, 16 and bend of the U-bar 15 through sleeve 24. Length of plate 23A is reduced.

In another embodiment, the elevator member is rigidly attached to the spine member.

The U-lock holder is preferably steel but may comprise other materials.

In another embodiment, the spine with attached collar, and sleeve, and hinge is an integrated single part manufactured by casting.

In view of these modifications, it is therefore wished that the scope of this invention be defined by the claims.

What is claimed is:

1. A U-Lock holder for lockably storing a U-lock onto a bicycle and for carrying a package positioned on said U-lock holder on said bicycle, said U-lock including a U-bar with a pair of legs and a cross member having a pair of openings, said legs being insertable into said pair of openings, said U-lock holder comprising:

a spine member;

a collar secured to one end of said spine member and arranged for telescoping onto a seat post of a bicycle;

an elevator member;

means for attaching said elevator member to an opposite end of said spine member, said elevator member arranged for supporting said U-bar at a selectable orientation;

said elevator member comprising a stem attached on one end to said opposite end of said spine member and a cross piece perpendicularly attached to an opposite end of said stem;

a sleeve mounted on said spine member between said collar and said elevator member arranged for telescoping onto said cross member of said U-lock;

said sleeve being oriented perpendicular to an axis of said collar and perpendicular to a direction of travel of said bicycle;

said sleeve having a length that is less than a distance between said openings in said cross member providing that when each said leg is inserted and locked into one of said pair of openings, said U-lock is locked to said U-lock holder; whereby said U-Lock is rotatable about an axis of said cross member to where said U-bar is supported on said elevator member.

2. The U-lock holder of claim 1 wherein said means for attaching said elevator member to an opposite end of said spine member is a hinge whereby an incline of said U-bar on said elevator member is adjustable.

3. The U-lock holder of claim 1 wherein said spine member comprises a first plate having an edge secured perpendicularly to a second plate along a centerline of said second plate providing that a cross section of said spine is "T" shaped.

4. The U-lock holder of claim 1 wherein said collar comprises:

an axially oriented slot in a wall of said collar;

a pair of lobes, one lobe on one side of said slot and another said lobe on an opposite side of said slot;

a threaded bolt through said slot providing that, when said bolt is tightened onto said lobes, said collar squeezes a seat bar positioned in said collar.

5. The U-lock holder of claim 1 wherein said spine member and sleeve and elevator member are metal.

6. The U-lock holder of claim 1 further comprising at least one band having two ends attachable at locations on said U-lock holder arranged to bind a package to said pair of legs of said U-lock.

7. The U-lock holder of claim 1 wherein said sleeve dimensions are selected to permit sliding a leg of said U-bar through said sleeve to where a bend in said U-bar is positioned within said sleeve and said legs are supported on said cross piece of said elevator member.

8. The U-lock holder of claim 1 further comprising a band arranged to bind said U-bar to said cross piece whereby said U-bar is prevented from bouncing on said U-lock holder.

* * * * *